Aug. 9, 1932.                    H. FAHRBACH                    1,871,166
                                  REGENERATOR
                               Filed June 9, 1930
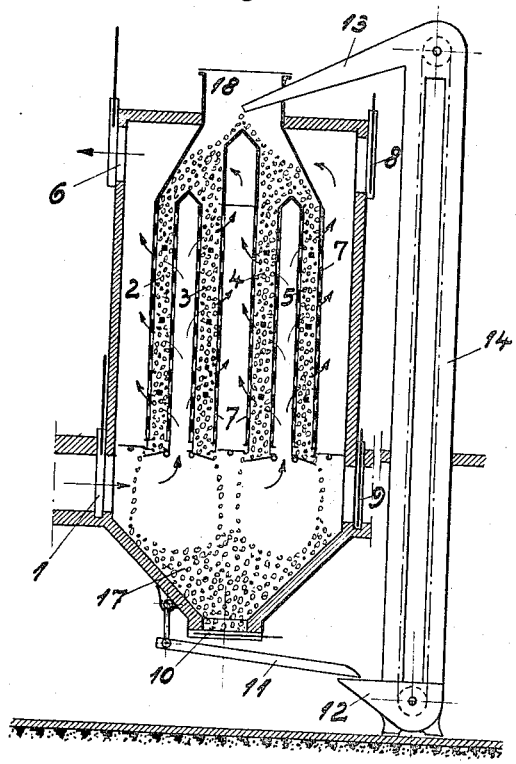
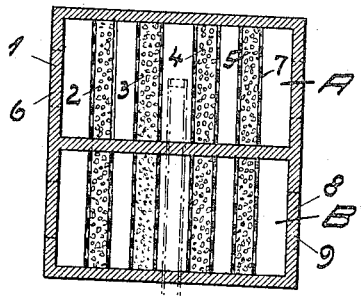
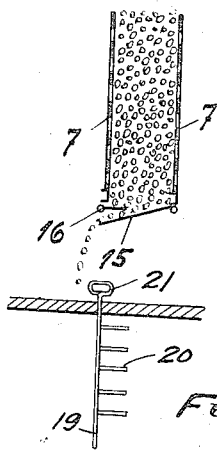
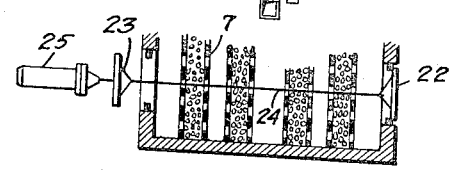

Patented Aug. 9, 1932

1,871,166

UNITED STATES PATENT OFFICE

HARRY FAHRBACH, OF RIGA, LATVIA

REGENERATOR

Application filed June 9, 1930, Serial No. 460,034, and in Germany June 25, 1929.

Heretofore it has been common to use economizers and air-preheaters and to cool the waste gases in these apparatus down to a temperature of about 150° C.

The principal object of my invention is to provide simple and efficient apparatus to improve the efficiency of a boiler plant by utilizing the residue heat still contained in the waste gases, escaping heretofore with 150° C. into the chimney, for heating the combustion air by cooling down these gases approximately to their dew point.

Heretofore regenerators have only been known for high temperature (1000° C.), especially as so called Cowpers, in connection with blast furnaces and consisting of fireproof brick-material; for medium temperatures (400° C.) regenerators have also been constructed of iron.

For temperatures much below 150° C. regenerators have not yet been constructed, as all iron constructions were destroyed by the acid moisture in the cold gases; further the passages for the gases became obstructed very soon. The chief difficulty, however, was this, that in the range of the very low gas temperatures for a certain heating effect very large heating surfaces are required (about 100 times larger than for the high temperature region).

This danger of corrosion and obstruction, the immense heating surfaces required and the comparatively small space available persuaded me to search for another solution of this problem. As a result of this I choose a coarse-grained indifferent material like glass balls or globular stones as "heating surface" for my new "restheat-regenerator", as this granular constitution allows the placing of about 500 square meters heating surface in a cubic meter of space instead of 35 to 150 square meters with plate-iron constructions or 10 to 20 square meters with regenerators of fireproof bricks. The effectivity of heat-transmission is almost the same in a stone-regenerator as in one with iron heating surfaces.

All the similar apparatus known heretofore, as Cowpers etc. are all working at high temperatures with thick layers of material consisting of large lumps and requiring high expenses for draught-power. As, however, according to my invention only a comparatively small gain can be drawn out of the waste heat with large heating surfaces, expenditures for the driving of fans for air and gases must be reduced to a minimum, otherwise the whole advantage of the heat recovery could be counterbalanced by these additional expenses.

In order to reduce the resistance for air and gases as much as possible I had to choose short passages and provide arrangements to keep them free and clean.

In the accompanying drawing an example of my invention is shown. Fig. 1 represents a cross section through my "waste heat regenerator", Fig. 2 a sectional plan view, Figure 3 is a partial vertical sectional view of a compartment, Figure 4 is a partial cross sectional view showing the means for operating the dampers or valves in unison, and Figure 5 shows a plan view of the scraper for ensuring a slow draining of the stones.

The waste gases, coming from the feed water economizer, enter the regenerator by the lower damper 1, pass through the thin layers 2, 3, 4, 5 of the chamber A of the regenerator and, after having transmitted their heat to the stones, escape by the upper damper 6 to the exhaust fan or chimney. The vertical sidewalls of the layers 2, 3, 4, 5 are formed by exchangeable sieves 7.

At the same time in the other chamber B of the regenerator the gas-dampers 1 and 6 are closed and the air-dampers 8 and 9 opened, so that the air enters by the top damper 8, passes in countercurrent to the gases through the layers 2, 3, 4, 5 and escapes, after absorption of heat out of the stones, by the lower damper 9 into the air duct, to which the undergrate blast fan is connected. After a certain time the currents of the two chambers A and B are exchanged, so that each chamber is alternately heated by the gases and afterwards cooled by the air.

The periodical changing of the gas-current to the air-current and of the air-current to the gas-current is performed by closing the gas-dampers 1 and 6 and at the same time opening the air-dampers 8 and 9. This simultaneous opening and closing of the 8 dampers can be performed by means of a turning shaft to which each of the sliding dampers is connected with a wire rope, wound round said shaft in the sense required. After certain adjustable periods of standstill the shaft makes a certain revolution by means of which 4 of the dampers are being lifted up and the other 4 lowered down hanging on their respective wire-ropes. The turning of the shaft can be effected by a counterweight, which can be lifted up and thrown over in one sense or the other respectively by the piston-rod of a slow moving hydraulic cylinder or any kind of electrical device. Instead of dampers, as shown on Fig. 1, certain valves (22, 23, Fig. 4) may be used, two corresponding ones sitting on a mutual rod 24 and being operated by a little steam cylinder 25. The steam is distributed to all of them periodically from a central distributing device.

As the passages through the coarse-grained material are by and by soiled by the gases and can not be sufficiently cleaned by the air provision must be taken to clean off the crust of dirt by rubbing the stones against each other or to burn it out, wash it off or blow it off by special means; these operations can either be performed in the regenerator itself or by draining the stones out at the base 10 of the regenerator and letting them pass over a shaking grate 11; instead of a shaking grate a transporting worm or a similar device can be used. From the shaking grate 11 the cleaned stones drop into a box 12 to be lifted up and dropped again into the top part of the regenerator by the channel 13. The lifting up of the filling material can either be done by means of an elevator, as shown on 14, Fig. 1, or simply by means of the box 12 being lifted by a small electrically driven crane. The narrow layers 2, 3, 4, 5 formed by the exchangeable sieves 7 can be provided with a pivoted damper 15, Fig. 3 at their base; besides that each layer has at its foot a scraper 16, which may consist of an iron rod 19 with a number of fingers 20 and a handle 21 on the outside of the regenerator. This scraper can be operated either by hand, tugging at the handle 21, or by any kind of mechanical device. The scraper moves with its fingers 20 along a narrow slot and insures a positive slow continuous or periodical draining of the stones, whereas by means of the pivoted damper 15 the respective layers can be emptied all at once. Besides that the scraper serves the purpose to loosen the high column of material and to secure a certain breathing of same so that a constant permeability of the layers might be maintained.

To render the operation of the described cleaning arrangement more stable special bunkers 17 and 18 for accumulation of material can be provided for at base and top of the regenerator.

Having thus described my invention, what I claim is:—

1. A heat regenerator comprising a container, a series of compartments in said container having perforated walls adapted to contain coarse-grained indifferent material and means for alternately directing into said compartments incoming air and combustion gases.

2. A heat regenerator comprising a container, a series of compartments in said container having perforated walls adapted to contain coarse grained material, and dampers located in said container for alternately directing the combustion gases or the incoming air into said compartments.

3. A heat regenerator comprising a container, a series of compartments in said container having perforated walls adapted to contain coarse grained material, a series of dampers located at the top and bottom of said compartment so that alternately incoming air and outgoing combustion gases may be directed through said compartments containing said coarse grained material.

4. A heat regenerator comprising a container, a series of receptacles in said container having perforated walls and said receptacles being adapted to contain coarse grained material, a hopper located above said receptacles for containing a supply of said coarse grained material for said receptacles and a hopper below said receptacles into which said coarse grained material falls from said receptacles.

5. A heat regenerator comprising a container, a series of receptacles in said container having perforated walls, said receptacles being adapted to contain coarse grained material, a series of pivoted flaps controlling the bottom of said receptacles, a hopper for said coarse grained material located at the top of said receptacles, a hopper located at the bottom of said container adapted to collect said coarse grained material from said receptacles and a series of dampers in said container whereby combustion gases and incoming air may be alternately directed into contact with said coarse grained material.

6. A heat regenerator comprising a container, a series of compartments in said container, sieves forming the walls thereof, said compartments being adapted to contain coarse grained material, a hopper located in the top of said container adapted to feed said material to said compartment and a hopper located in the lower part of said container adapted to collect the material from said compartment.

7. A heat regenerator comprising a container, a series of compartments in said container, removable sieves forming the walls of said compartments, said compartments being adapted to contain coarse grained material, pivoted retaining flaps at the bottom of each of said compartments normally retaining the material in said compartments, a hopper adapted to feed material into said compartments, a hopper located at the lower part of said container adapted to collect said material from said compartments and a series of dampers in said container adapted to direct combustion gases into said compartments and through the material contained therein.

8. A heat regenerator comprising a container divided into two main compartments, a series of receptacles having perforated walls located in each compartment, valves located in said container communicating with each compartment and means for regulating said valves so that combustion gases may be led through one compartment in contact with the receptacles therein while incoming air may be led through the other compartment in contact with the receptacles therein.

9. A heat regenerator comprising a container having a plurality of compartments, a series of receptacles having apertured walls located in each compartment, said receptacles being adapted to contain heat transmitting material, valves located in said container communicating with each compartment and means for regulating said valves so that combustion gases and incoming air may be directed alternately into the receptacles in each compartment.

10. A heat regenerator comprising a container having a plurality of compartments, a series of receptacles in each compartment, a hopper communicating with each series of receptacles, a hopper located in said container below each series of receptacles, said receptacles being adapted to contain heat transmitting material and means for transmitting said heat transmitting material from the hoppers located below said receptacles to the hoppers located above said receptacles.

In witness whereof I have hereunto set my hand.

HARRY FAHRBACH.